(12) United States Patent
Ouchi

(10) Patent No.: US 10,767,631 B2
(45) Date of Patent: Sep. 8, 2020

(54) POWER GENERATION SAILING SHIP AND A HYDROGEN PRODUCTION AND SUPPLY SYSTEM

(71) Applicant: Ouchi Ocean Consultant, Inc., Nagano (JP)

(72) Inventor: Kazuyuki Ouchi, Nagano (JP)

(73) Assignee: Ouchi Ocean Consultant, Inc., Nagano (JP)

( * ) Notice: Subject to any disclaimer, the term of this patent is extended or adjusted under 35 U.S.C. 154(b) by 0 days.

(21) Appl. No.: 16/260,690

(22) Filed: Jan. 29, 2019

(65) Prior Publication Data

US 2019/0226455 A1    Jul. 25, 2019

Related U.S. Application Data

(62) Division of application No. 15/189,352, filed on Jun. 22, 2016, now abandoned.

(30) Foreign Application Priority Data

Jul. 21, 2015 (JP) ................................ 2015-143548
Sep. 27, 2015 (JP) ................................ 2015-189062

(51) Int. Cl.
*C25B 1/04* (2006.01)
*C25B 1/02* (2006.01)
(Continued)

(52) U.S. Cl.
CPC ................ *F03D 9/19* (2016.05); *B63B 35/00* (2013.01); *B63B 35/44* (2013.01); *B63H 9/04* (2013.01); *C01B 3/0015* (2013.01); *C10G 45/44* (2013.01); *C25B 1/04* (2013.01); *C25B 9/06* (2013.01); *F01D 15/10* (2013.01); *F03D 9/25* (2016.05); *H02K 7/1823* (2013.01); *B63B 2035/009* (2013.01); *B63B 2035/4466* (2013.01);
(Continued)

(58) Field of Classification Search
CPC ............ C25B 15/08; C25B 15/02; C25B 9/00
See application file for complete search history.

(56) References Cited

U.S. PATENT DOCUMENTS 3,306,706 A    2/1967    Schuman
5,027,735 A    7/1991    Labrador
(Continued)

FOREIGN PATENT DOCUMENTS

JP    50-32697    3/1975
JP    2005-145218 A    6/2005
(Continued)

OTHER PUBLICATIONS

Extended European Search Report issued in co-pending application 16176133.3, completed Nov. 14, 2016 and dated Dec. 8, 2016.
(Continued)

*Primary Examiner* — Zulmariam Mendez
(74) *Attorney, Agent, or Firm* — Merchant & Gould, P.C.

(57) ABSTRACT

A power generation sailing ship has a sail provided on a deck, a water turbine connected to a front end of a shaft passing through a bow part outer hull and extending forward, a power generator disposed in a front body of the sailing ship and connected to a rear end of the shaft, and an energy storage device for directly storing electric energy generated by the power generator or converting the electric energy into energy of a substance and storing the substance.

7 Claims, 3 Drawing Sheets

(51) Int. Cl.
  *C25B 9/00*     (2006.01)
  *F03D 9/19*     (2016.01)
  *B63B 35/00*    (2020.01)
  *F03D 9/25*     (2016.01)
  *B63B 35/44*    (2006.01)
  *B63H 9/04*     (2020.01)
  *C01B 3/00*     (2006.01)
  *C10G 45/44*    (2006.01)
  *C25B 9/06*     (2006.01)
  *F01D 15/10*    (2006.01)
  *H02K 7/18*     (2006.01)
  *B63H 21/00*    (2006.01)
  *B63J 3/04*     (2006.01)

(52) U.S. Cl.
  CPC ... *B63H 2021/003* (2013.01); *B63J 2003/046* (2013.01); *Y02E 10/28* (2013.01); *Y02E 60/324* (2013.01); *Y02E 60/366* (2013.01); *Y02P 70/527* (2015.11); *Y02T 70/70* (2013.01); *Y02T 90/38* (2013.01)

(56) References Cited

U.S. PATENT DOCUMENTS

| | | |
|---|---|---|
| 2005/0252764 A1 | 11/2005 | Meller |
| 2012/0321549 A1 | 12/2012 | Okada et al. |
| 2014/0345513 A1 | 11/2014 | Sancoff |
| 2014/0363351 A1 | 12/2014 | Sugimasa |

FOREIGN PATENT DOCUMENTS

| | | |
|---|---|---|
| JP | 2005-216774 A | 8/2005 |
| JP | 2006-177264 A | 7/2006 |
| JP | 2013-136801 A | 7/2013 |
| JP | 2014-184935 A | 10/2014 |
| JP | 2015-098421 A | 5/2015 |

OTHER PUBLICATIONS

Office Action issued in corresponding Japanese application 2015-189062 dated Jul. 18, 2017.

Office Action issued in corresponding Japanese application 2015-189062 dated Jan. 30, 2018.

10,767,631 B2

POWER GENERATION SAILING SHIP AND A HYDROGEN PRODUCTION AND SUPPLY SYSTEM

This application is a Divisional of U.S. patent application Ser. No. 15/189,352, filed Jun. 22, 2016, which claims priority from Japanese Patent Application No. 2015-143548, filed Jul. 21, 2015, and 2015-189062, filed Sep. 27, 2015, the entire disclosures of which are incorporated herein by reference.

FIELD OF THE INVENTION

The present invention relates to a power generation sailing ship and a hydrogen production and supply system.

BACKGROUND OF THE INVENTION

Japanese Patent Laid-Open Publication No. 2014-184935 discloses a power generation sailing ship comprising a sail provided on a deck, a water turbine connected to a lower end of a shaft passing through a stern part hull shell plate and extending downward, a power generator disposed in a stern body and connected to an upper end of the shaft, and an electric energy storage device for directly storing electric energy generated by the power generator.

In the power generation sailing ship of Japanese Patent Laid-Open Publication No. 2014-184935, the sail converts wind power to kinetic energy of a ship body so as to generate sea water flow relative to the water turbine, the relative sea water flow drives the water turbine, the water turbine drives the power generator so as to generate electric energy, and the electric energy storage device directly stores generated electric energy.

As the relative sea water flow supplies a part of its kinetic energy to the water turbine, it decelerates aft of the water turbine. In the power generation sailing ship of Japanese Patent Laid-Open Publication No. 2014-184935, the decelerated relative water flow aft of the water turbine is left to flow off to the stern direction of the ship without affecting propulsion performance of the ship.

An object of the present invention is to provide a power generation sailing ship comprising a sail provided on a deck, a water turbine, a power generator driven by the water turbine, and a device for directly storing electric energy generated by the power generator or converting the electric energy into energy of a substance and storing the substance, wherein decelerated relative water flow aft of the water turbine is effectively utilized for enhancing propulsion performance of the ship. Another object of the present invention is to provide a hydrogen production and supply system comprising an aforesaid power generation sailing ship.

SUMMARY OF THE INVENTION

In accordance with the present invention, there is provided a power generation sailing ship comprising a sail provided on a deck, a water turbine connected to a front end of a shaft passing through a bow part hull shell plate and extending forward, a power generator disposed in a front body and connected to a rear end of the shaft, and an energy storage device for directly storing electric energy generated by the power generator or converting the electric energy into energy of a substance and storing the substance.

When a water turbine is connected to a front end of a shaft passing through a bow part hull shell plate and extending forward, a decelerated relative water flow aft of the water turbine can be effectively utilized for decreasing propulsion resistance of the sailing ship aft of the water turbine. As a result, ship speed increases and efficiency of power generation is enhanced.

When electric energy generated by the power generator is directly stored in the energy storage device or converted to energy of a substance and stored in the energy storage device, the generated energy can be sea transported to a land energy base.

In accordance with the present invention, there is provided a power generation sailing ship comprising a pair of the aforesaid power generation sailing ships disposed parallel to each other at a predetermined distance apart with their bows directed in the same direction, wherein the pair of power generation sailing ships are connected to each other at upper decks.

Wave resistance of a catamaran ship having two narrow parallel hulls is smaller than that of a monohull ship having a single wide hull, provided they have the same length and the same dead weight. Therefore, ship speed of the former becomes faster than that of the latter and efficiency of power generation of the former becomes higher than that of the latter.

In accordance with a preferred aspect of the present invention, the power generation sailing ship further comprises a hydrogen generator for electrolyzing water by electric power generated by the power generator, storage tanks for storing aromatic compound and hydrogenated aromatic compound, a hydrogenated aromatic compound generator for reacting aromatic compound with hydrogen, a liquid feeder for feeding aromatic compound from a storage tank to the hydrogenated aromatic compound generator and feeding hydrogenated aromatic compound from the hydrogenated aromatic compound generator to a storage tank, and an unloader for unloading the hydrogenated aromatic compound from the storage tank.

Considering the coming of a "hydrogen society," it is desirable to convert electric energy generated by the power generator to hydrogen and sea transport the hydrogen to a land energy base. Hydrogenated aromatic compounds, which are reaction products between aromatic compounds such as benzene, toluene, xylene, mesitylene, naphthalene, methylnaphthalene, anthracene, biphenyl, phenanthrene, etc., and hydrogen, are stable substances that assume liquid state under normal temperature and normal pressure. The hydrogenated aromatic compounds are suited for sea transportation to a land energy base. The sea transported hydrogenated aromatic compounds can be unloaded to the land energy base and reacted with dehydrogenation catalyst in the land energy base so as to be separated into hydrogen and aromatic compound.

In accordance with a preferred aspect of the present invention, the aromatic compound is benzene or toluene or naphthalene, and the hydrogenated aromatic compound is cyclohexane or methylcyclohexane or decalin.

Benzene, toluene and naphthalene are suitable for hydrogen carrier.

In accordance with the present invention, there is provided a hydrogen production and supply system comprising the aforesaid power generation sailing ship, a ground-based aromatic compound storage tank, a ground-based hydrogenated aromatic compound storage tank, a ground-based hydrogen separator for separating hydrogenated aromatic compound into hydrogen and aromatic compound, a first aromatic compound feeder for feeding aromatic compound from the ground-based aromatic compound storage tank to the storage tank of the power generation sailing ship berthed at a pier or anchored offshore, a hydrogenated aromatic compound feeder for feeding hydrogenated aromatic compound from the ground-based hydrogenated aromatic compound storage tank to the ground-based hydrogen separator, and a second aromatic compound feeder for feeding aromatic compound from the hydrogen separator to the ground-based aromatic compound storage tank.

In the hydrogen production and supply system of the present invention, electric power is generated by utilizing abundant marine wind power energy, generated electric energy is converted into hydrogen energy, hydrogen is converted into stable hydrogenated aromatic compound, the hydrogenated aromatic compound is sea transported to a land energy base, the hydrogenated aromatic compound is unloaded from the storage tank to the ground-based hydrogenated aromatic compound storage tank, the hydrogenated aromatic compound is separated into hydrogen and aromatic compound in the land energy base, and the aromatic compound is returned to the power generation sailing ship. As a result, hydrogen can be supplied to the market safely and without emitting carbon dioxide and the aromatic compound can be reused repeatedly as hydrogen carrier.

In accordance with a preferred aspect of the present invention, the aromatic compound is benzene or toluene or naphthalene, and hydrogenated aromatic compound is cyclohexane or methylcyclohexane or decalin.

Benzene, toluene and naphthalene are suitable for hydrogen carrier.

DETAILED DESCRIPTION OF THE PREFERRED EMBODIMENTS

Power generation sailing ships and a hydrogen production and supply system in accordance with preferred embodiments of the present invention will be described.

Figure 1:
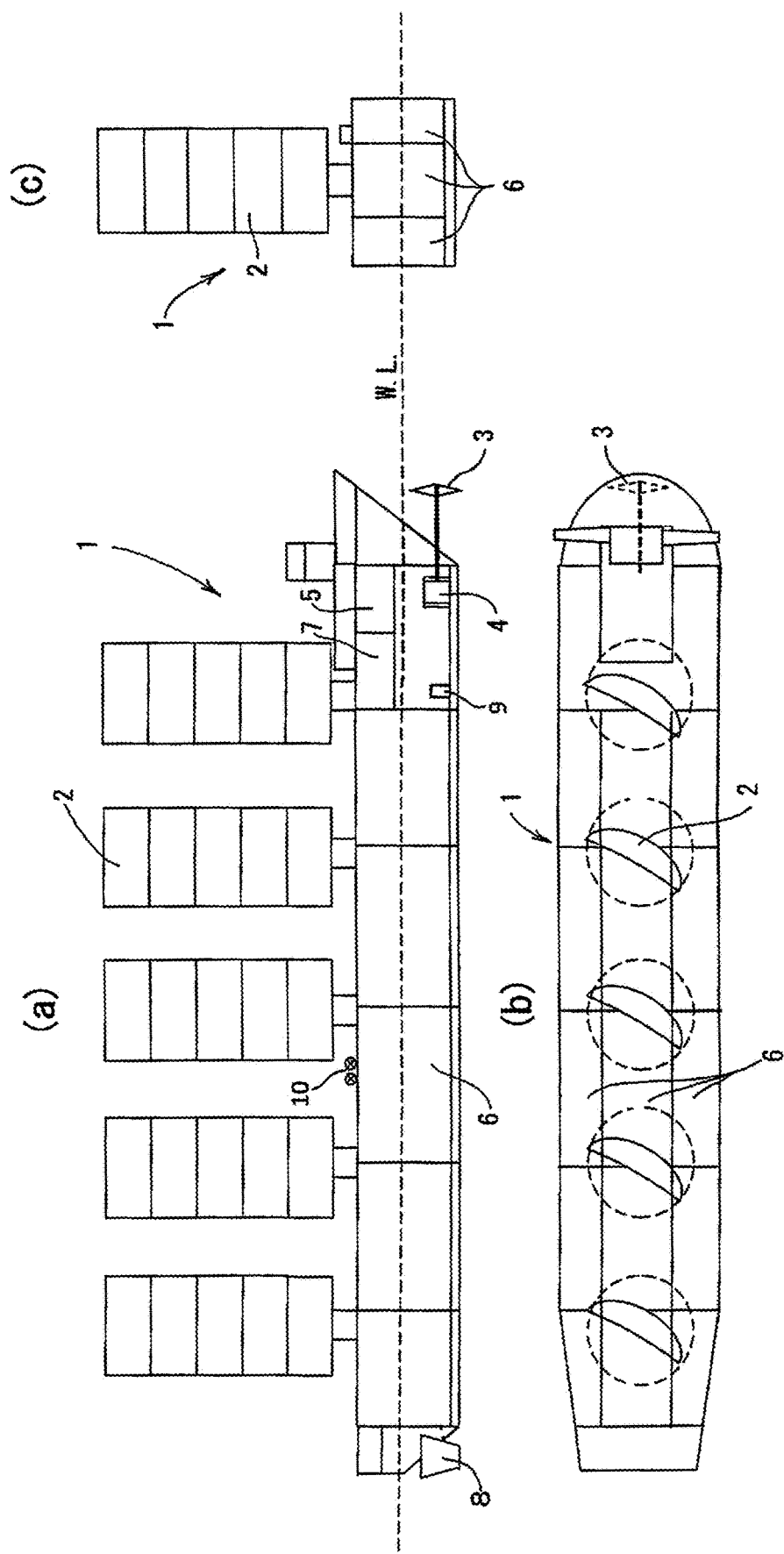
FIG. 1 is a set of structural views of a power generation sailing ship in accordance with a preferred embodiment of the present invention, in which (a) is a side view, (b) is a plan view and (c) is a midship sectional view.

As shown in FIG. 1, a power generation sailing ship 1 comprises a plurality of vertically telescopic hard sails 2 provided on a deck, a screw propeller type water turbine 3 connected to a front end of a shaft passing through a bow part hull shell plate and extending forward, a power generator 4 disposed in a front body and connected to a rear end of the shaft, a hydrogen generator 5 for electrolyzing water by electric power generated by the power generator 4 so as to generate hydrogen, a plurality of storage tanks 6 disposed at midship and stern parts of the ship and storing toluene and methylcyclohexane, a methylcyclohexane generator 7 for reacting toluene with hydrogen so as to generate methylcyclohexane, a rudder 8 disposed at a stern part, a pump 9 for feeding toluene from the storage tanks 6 to the methylcyclohexane generator 7 and feeding methylcyclohexane from the methylcyclohexane generator 7 to the storage tanks 6, and an unloader 10 for unloading the methylcyclohexane from the storage tanks 6 to methylcyclohexane storage tanks in a land energy base. Before the power generation sailing ship 1 begins hydrogen generating operation, one of the storage tanks 6 is empty and the others are filled with toluene.

In the power generation sailing ship 1, the hard sails 2 convert wind power to kinetic energy of the power generation sailing ship 1 so as to cause the power generation sailing ship 1 to move forward, thereby generating sea water flow relative to the water turbine 3. The sea water flow relative to the water turbine 3 drives the water turbine 3 to rotate, and the water turbine 3 drives the power generator 4 to generate electric power. The hydrogen generator 5 utilizes the generated electric power to electrolyze water, thereby generating hydrogen. The pump 9 feeds toluene from one of the storage tanks 6 filled with toluene to the methylcyclohexane generator 7. The methylcyclohexane generator 7 reacts toluene with hydrogen to generate methylcyclohexane. The pump 9 feeds methylcyclohexane from methylcyclohexane generator 7 to the empty storage tank 6. The empty storage tank 6 becomes filled with methylcyclohexane and the storage tank 6 from which toluene was fed to the methylcyclohexane generator 7 becomes empty. The pump 9 feeds toluene from another storage tank 6 filled with toluene to the methylcyclohexane generator 7. The methylcyclohexane generator 7 reacts toluene with hydrogen to generate methylcyclohexane. The pump 9 feeds methylcyclohexane from methylcyclohexane generator 7 to the empty storage tank 6. The empty storage tank 6 becomes filled with methylcyclohexane and the storage tank 6 from which toluene was fed to the methylcyclohexane generator 7 becomes empty. The aforesaid procedure is repeated and whole quantity of toluene stored in the plurality of storage tanks 6 is replaced with methylcyclohexane.

The power generation sailing ship 1 sea transports methylcyclohexane, which is a stable substance assuming liquid state under normal temperature and normal pressure, to a land energy base. The unloader 10 operates to unload methylcyclohexane from the storage tanks 6 to a ground-based methylcyclohexane storage tank in the land energy base. Methylcyclohexane is separated into toluene and hydrogen at the land energy base and hydrogen is supplied to the market. Thus, hydrogen energy derived from wind energy, which is one of the renewable energies, can be supplied to the developing hydrogen society.

The water turbine 3 is connected to a front end of a shaft passing through a bow part hull shell plate and extending forward. Thus, the power generation sailing ship 1 moves in a decelerated relative water flow aft of the water turbine 3. As a result, propulsion resistance of the power generation sailing ship 1 decreases, ship speed increases and efficiency of power generation is enhanced. In the power generation sailing ship of Japanese Patent Laid-Open Publication No. 2014-184935, the water turbine is connected to the lower end of a shaft passing through stern part bottom hull shell plate to extend downward. Therefore, the water turbine obstructs the ship's approach to a dock when the ship is to be repaired. On the other hand, in the power generation sailing ship 1, the water turbine 3 does not obstruct docking of the ship because the water turbine 3 projects forward from the bow part hull shell plate.

Methylcyclohexane generation reaction by toluene and hydrogen is an exothermic reaction. Heat generated by the methylcyclohexane generation reaction can be effectively utilized for various needs in the ship.

Figure 2:
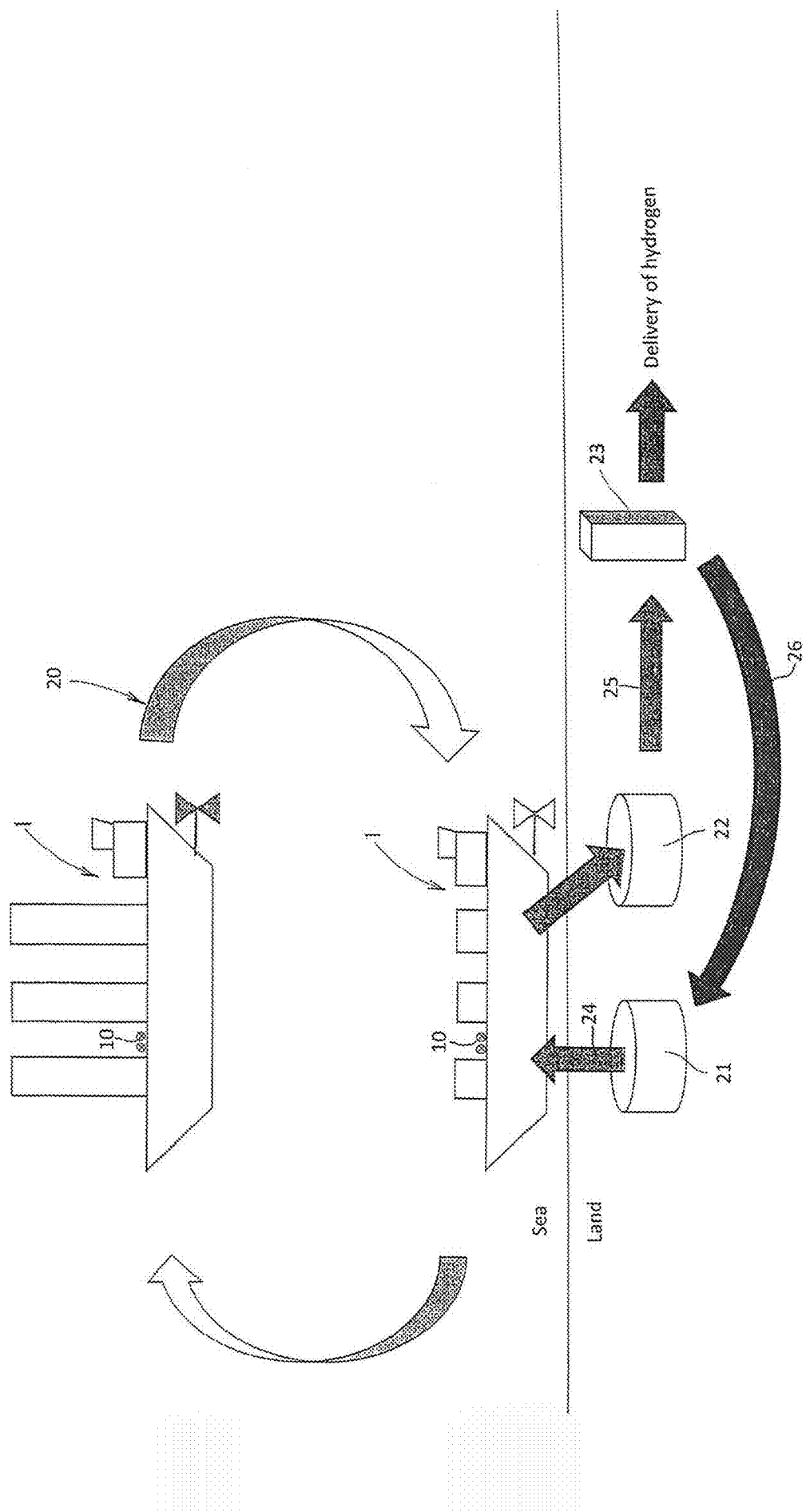
FIG. 2 is a conceptual diagram of a hydrogen production and supply system in accordance with a preferred embodiment of the present invention.

As shown in FIG. 2, a hydrogen production and supply system 20 comprises the power generation sailing ship 1 shown in FIG. 1, a ground-based toluene storage tank 21, a ground-based methylcyclohexane storage tank 22, a ground-based hydrogen separator 23 for separating methylcyclohexane into hydrogen and toluene by utilizing catalyst, for example, a separator which is an enlarged version of a dehydrogenation apparatus disclosed in Japanese Patent Laid-Open Publication No. 2005-216774, a first toluene feeder 24 for feeding toluene in the ground-based toluene storage tank 21 to the storage tanks 6 of the power generation sailing ship 1 berthed at a pier or anchored offshore, a methylcyclohexane feeder 25 for feeding methylcyclohexane in the ground-based methylcyclohexane storage tank 22 to the ground-based hydrogen separator 23, and a second toluene feeder 26 for feeding toluene from the hydrogen separator 23 to the ground-based toluene storage tank 21.

In the hydrogen production and supply system 20, the power generation sailing ship 1 generates electric power by utilizing abundant marine wind power energy, converts electric energy into hydrogen energy, converts hydrogen into stable methylcyclohexane, sea transports methylcyclohexane to a land energy base, and unloads the methylcyclohexane to the ground-based methylcyclohexane storage tank 22. The hydrogen separator 23 in the land energy base separates methylcyclohexane into hydrogen and toluene, and toluene is returned to the power generation sailing ship 1 through the ground-based toluene storage tank 21. As a result, hydrogen can be supplied to the market safely and without emitting carbon dioxide and the toluene can be reused repeatedly as hydrogen carrier.

Toluene is used as hydrogen carrier in the aforesaid preferred embodiment. Other kind of aromatic compound such as benzene, naphthalene, etc., can also be used as hydrogen carrier.

In the aforesaid preferred embodiment, wind power is converted to electric power by the power generation sailing ship 1, the electric power is converted to hydrogen energy, and the hydrogen is converted to methylcyclohexane. Alternatively, the electric power converted from the wind power can be directly stored in a battery and transported to a land energy base or hydrogen generated by the electric power can be liquefied or absorbed in a hydrogen storage alloy and transported to a land energy base.

The number of water turbines is not limited to one. When the power generation sailing ship 1 has deep draft, it is practical to provide a single water turbine having large sweep area. When the power generation sailing ship 1 has shallow draft, it is practical to provide a plurality of water turbines having small sweep area.

Figure 3:
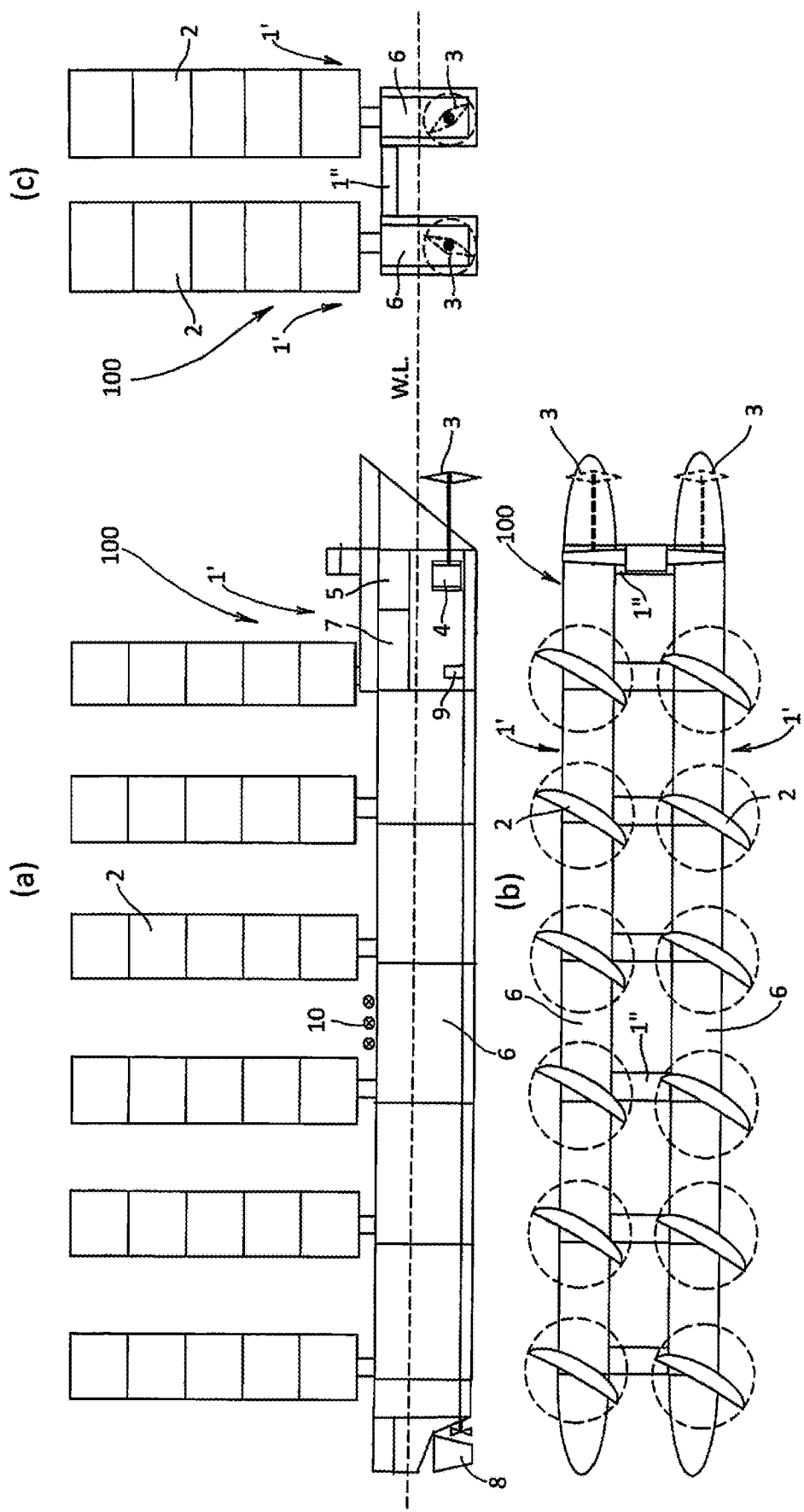
FIG. 3 is a set of structural views of a power generation sailing ship in accordance with another preferred embodiment of the present invention, in which (a) is a side view, (b) is a plan view and (c) is a midship sectional view.

In the aforesaid preferred embodiment, the power generation sailing ship 1 is a monohull ship. As shown in FIG. 3, a catamaran type power generation sailing ship 100 can be used instead of the monohull type power generation sailing ship 1. The catamaran type power generation sailing ship 100 comprises a pair of narrow power generation sailing ships 1' each of which is provided with the same equipment as the power generation sailing ship 1. The pair of narrow power generation sailing ships 1' are disposed parallel to each other at a predetermined distance apart with their bows directed in the same direction. The pair of power generation sailing ships 1' are connected to each other at upper decks 1" at a plurality of longitudinal positions. They can also be connected at upper decks 1" throughout the length.

Wave resistance of a catamaran ship 100 having two narrow power generation sailing ships 1' disposed in parallel is smaller than that of a power generation sailing ship 1 having a single wide hull, provided they have the same length and the same dead weight. Therefore, ship speed of the former becomes faster than that of the latter and efficiency of power generation of the former becomes higher than that of the latter.

The present invention can be widely used for power generation sailing ships and hydrogen production and supply systems.

The invention claimed is:

1. A method for using a power generation sailing ship comprising a sail provided on a deck, a water turbine connected to a front end of a shaft passing through a bow part hull shell plate and extending forward, a power generator disposed in a front body and connected to a rear end of the shaft, a hydrogen generator for electrolyzing water by electric power generated by the power generator, a plurality of storage tanks for storing aromatic compound and hydrogenated aromatic compound, a hydrogenated aromatic compound generator for reacting aromatic compound with hydrogen, a liquid feeder for feeding aromatic compound in a storage tank to the hydrogenated aromatic compound generator and feeding hydrogenated aromatic compound from the hydrogenated aromatic compound generator to a storage tank, and an unloader for unloading the hydrogenated aromatic compound from the storage tank, comprising the steps of emptying one of the storage tanks and filling others with aromatic compound, generating electric power by utilizing marine wind power energy, electrolyzing water by the generated electric power so as to generate hydrogen, feeding the aromatic compound from one of the storage tanks filled with the aromatic compound to the hydrogenated aromatic compound generator, feeding hydrogenated aromatic compound from the hydrogenated aromatic compound generator to the empty storage tank, thereby filling the empty storage tank with hydrogenated aromatic compound and emptying the one of the storage tanks filled with the aromatic compound, and repeating feeding the aromatic compound from one of the storage tanks filled with the aromatic compound to the hydrogenated aromatic compound generator and feeding hydrogenated aromatic compound from the hydrogenated aromatic compound generator to the empty storage tank, thereby replacing a whole quantity of the aromatic compound in the storage tanks with hydrogenated aromatic compound.

2. A method for using a power generation sailing ship of claim 1, further comprising the steps of disposing a pair of power generation sailing ships of claim 1 parallel to each other at a predetermined distance apart with their bows directed in the same direction, and connecting the pair of power generation sailing ships to each other at upper decks.

3. A method for using a power generation sailing ship of claim 1, wherein the aromatic compound is benzene or toluene or naphthalene, and hydrogenated aromatic compound is cyclohexane or methylcyclohexane or decalin.

4. A method for producing and supplying hydrogen comprising the steps of sea transporting the hydrogenated aromatic compound generated by the method of claim 1 by using the power generation sailing ship to a land energy base by the power generation sailing ship, unloading the hydrogenated aromatic compound to a ground-based hydrogenated aromatic compound storage tank, separating the hydrogenated aromatic compound into hydrogen and the aromatic compound by a separator in the land energy base, and returning the aromatic compound to the power generation sailing ship.

5. A method for using a power generation sailing ship of claim 2, wherein the aromatic compound is benzene or toluene or naphthalene, and hydrogenated aromatic compound is cyclohexane or methylcyclohexane or decalin.

6. A method for producing and supplying hydrogen comprising the steps of sea transporting the hydrogenated aromatic compound generated by the method of claim 2 by using the power generation sailing ship to a land energy base by the power generation sailing ship, unloading the hydrogenated aromatic compound to a ground-based hydrogenated aromatic compound storage tank, separating the hydrogenated aromatic compound into hydrogen and the aromatic compound by a separator in the land energy base, and returning the aromatic compound to the power generation sailing ship.

7. A method for producing and supplying hydrogen comprising the steps of sea transporting the hydrogenated aromatic compound generated by the method of claim 3 by using the power generation sailing ship to a land energy base by the power generation sailing ship, unloading the hydrogenated aromatic compound to a ground-based hydrogenated aromatic compound storage tank, separating the hydrogenated aromatic compound into hydrogen and the aromatic compound by a separator in the land energy base, and returning the aromatic compound to the power generation sailing ship.

\* \* \* \* \*